(No Model.) 4 Sheets—Sheet 1.
H. L. PHILLIPS.
CONCENTRATOR AND SLUICE BOX.
No. 547,382. Patented Oct. 1, 1895.
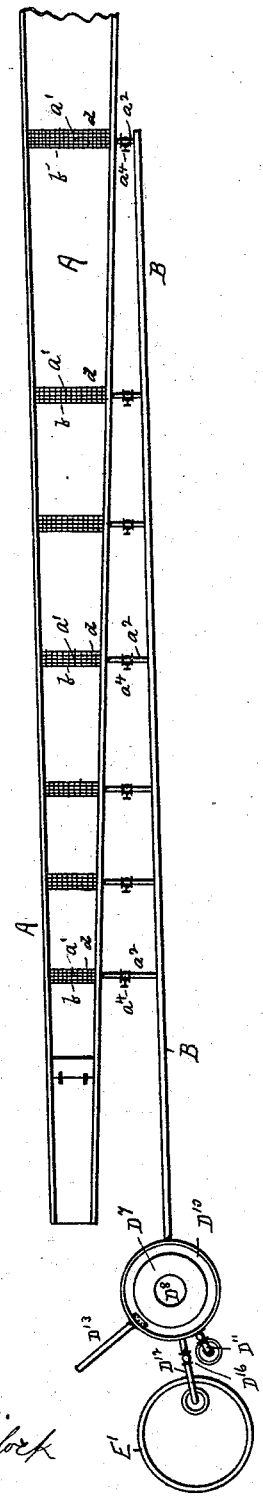
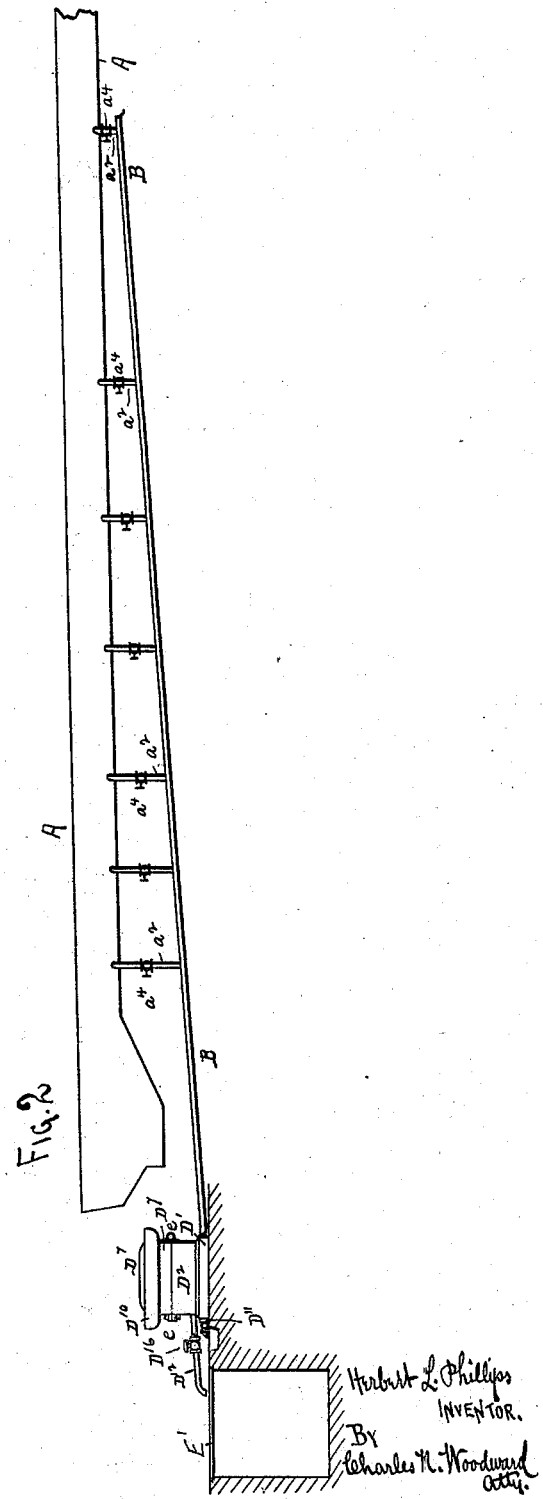
WITNESSES.
E. C. Wheelock
G. H. Vernon
Herbert L. Phillips
INVENTOR.
By Charles N. Woodward
Atty.

(No Model.) 4 Sheets—Sheet 2.
H. L. PHILLIPS.
CONCENTRATOR AND SLUICE BOX.
No. 547,382. Patented Oct. 1, 1895.
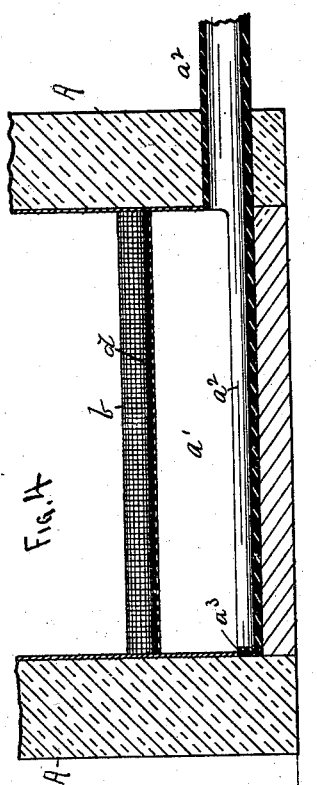
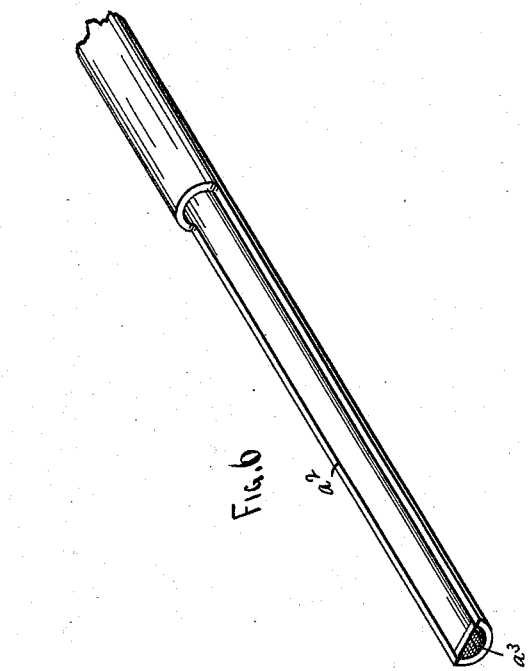
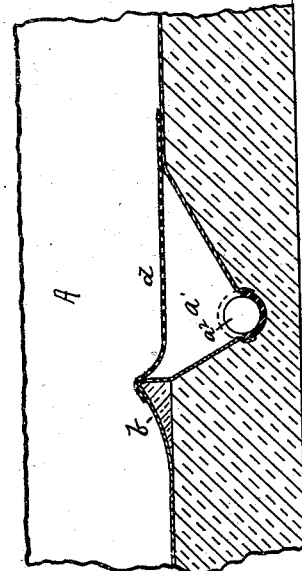
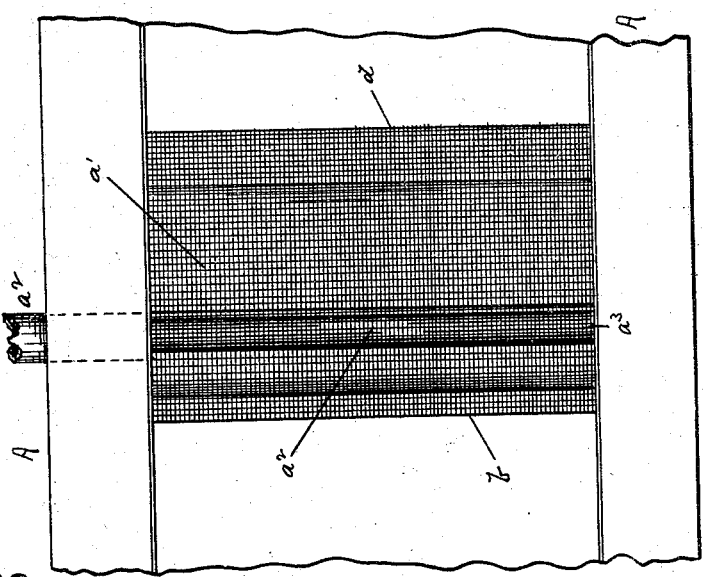
WITNESSES.
E. C. Wheelock
G. H. Vernon
Herbert L. Phillips.
INVENTOR,
By Charles N. Woodward Atty.

(No Model.) 4 Sheets—Sheet 3.
H. L. PHILLIPS.
CONCENTRATOR AND SLUICE BOX.
No. 547,382. Patented Oct. 1, 1895.
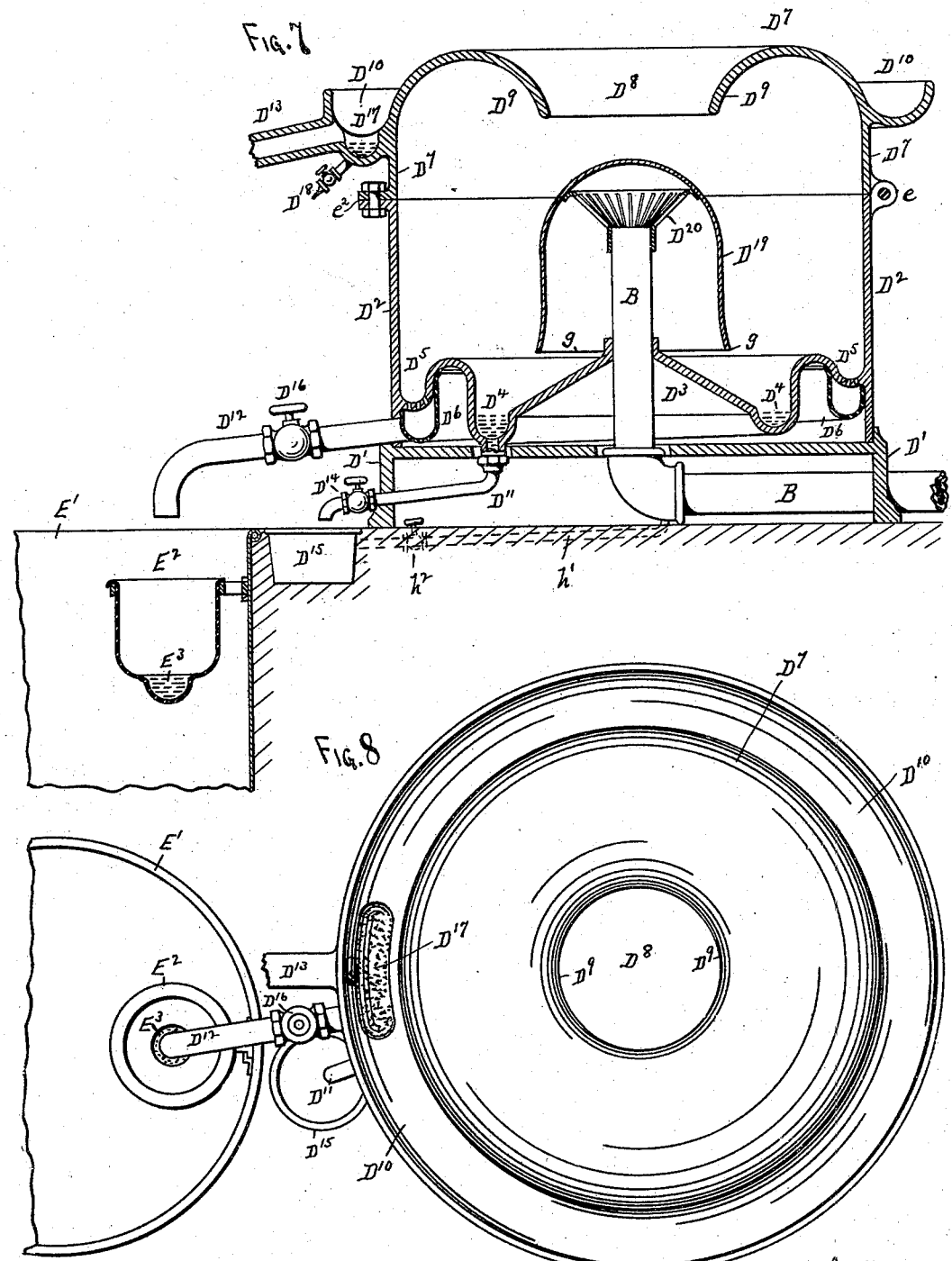
WITNESSES.
E. C. Wheelock
G. H. Vernon
Herbert L. Phillips,
INVENTOR.
By Charles N. Woodward, Atty.

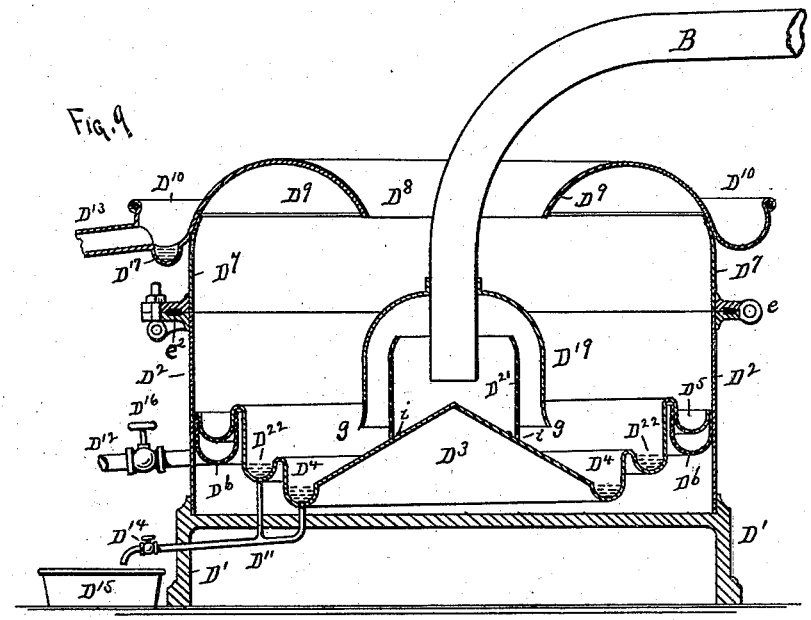
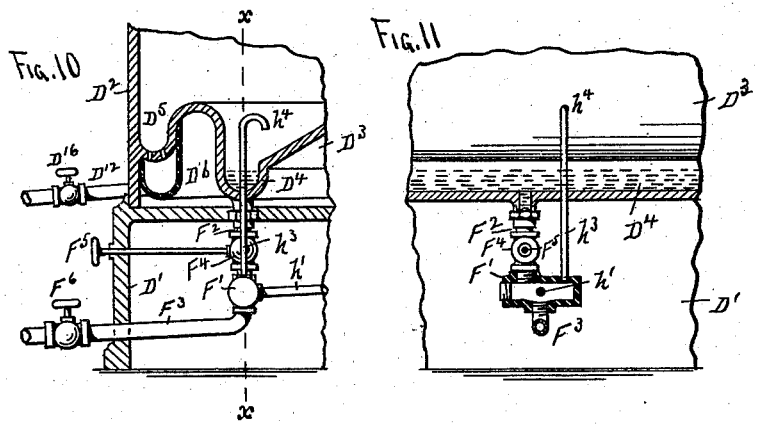
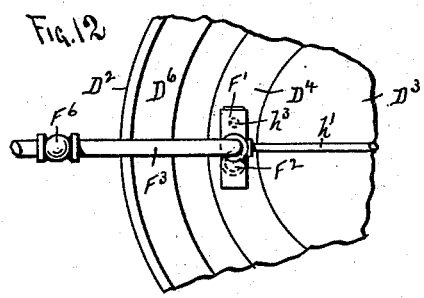

A UNITED STATES PATENT OFFICE.

HERBERT L. PHILLIPS, OF ST. PAUL, MINNESOTA.

CONCENTRATOR AND SLUICE-BOX.

SPECIFICATION forming part of Letters Patent No. 547,382, dated October 1, 1895.

Application filed August 24, 1894. Serial No. 521,175. (No model.)

*To all whom it may concern:*

Be it known that I, HERBERT L. PHILLIPS, a citizen of the United States, residing at St. Paul, in the county of Ramsey, State of Minnesota, have made certain new and useful Improvements in Concentrators and Sluice-Boxes, of which the following is a specification.

In this apparatus is comprised a sluice-box through which the reduced material containing the metals to be separated is caused to pass by the action of running water, a series of gathering pans or riffles in which the particles of the metals are gathered, and a concentrator into which the gathered material is conducted from the sluice-box, and in which the particles of the metals are separated and retained; and the invention consists in the construction, combination, and arrangement of parts, as hereinafter shown and described, and specifically pointed out in the claims.

In the drawings, Figure 1 is a plan view, and Fig. 2 is a side elevation, of the apparatus complete. Fig. 3 is an enlarged longitudinal section. Fig. 4 is an enlarged cross-section, and Fig. 5 is an enlarged plan view, of a section of the sluice-box, showing the construction of the combined riffle and gathering pans. Fig. 6 is a perspective view of one of the combined discharge-pipes and receiving-troughs detached. Fig. 7 is an enlarged cross-sectional view, and Fig. 8 is an enlarged plan view, of the concentrator and its connections. Fig. 9 is an enlarged cross-sectional view of the concentrator, illustrating some modifications in the construction. Fig. 10 is a sectional detail on the same scale as Figs. 7, 8, and 9 of a section of the lower portion of the concentrator, illustrating some modifications in the arrangement of some of the connections. Fig. 11 is a section on the line $x\,x$ of Fig. 10. Fig. 12 is a bottom plan view of the parts shown in Fig. 10.

A is the sluice-box, which may be of any required length or size, according to the capacity required, and will preferably be made converging from the "head" to the "tail," as shown. The material containing the metal to be separated is first crushed or otherwise separated into grades and scoured and disintegrated by any suitable apparatus—such, for instance, as is used in "placer" mining and fed into the head end of the sluice-box by a stream of water in the usual manner. At intervals across the bottom of the sluice-box are formed pans or sunken riffles, constructed as shown in Figs. 3, 4, and 5, consisting of cavities $a'$, cut across the sluice-box in the bottom and having inclined sides and sunken below the surface and ending in small troughs or receivers $a^2$ in the bottom. These receivers are formed by cutting a tube of gas or steam pipe in half lengthwise for a distance equal to the width of the sluice-box, closing the end $a^3$, as shown, and inserting it from the outside, as shown in Figs. 4 and 5. The sluice-box is set at a sufficient incline to cause the water to run freely, and at the lower side of each of the sunken riffles $a'$ the bottom of the sluice is elevated in the form of an obstruction $b$, so that the flowing material is retarded somewhat above each riffle. The interior of the sluice-box and also the obstruction $b$ and the riffles $a'$ will be lined with sheet-copper or any other suitable material which will receive mercury-amalgam. Over each of the riffles $a'$ is a cover $d$ of perforated metal, preferably of copper and with its downstream end curved upward and resting over the obstruction $b$, so that the entire "riffle" is covered and the perforated cover easily removable when required. The outer ends of the tubes $a^2$ are tapped into a main pipe B, leading at an incline into the bottom of the concentrator. This concentrator consists of a base $D'$, supporting a casing $D^2$, having a conical bottom $D^3$, up through which the pipe B projects into the interior of the casing, as shown.

Around the lower edge of the conical bottom $D^3$ is formed a mercury-trough $D^4$, and $D^5$ is another trough running around the interior of the casing a short distance above the mercury-trough and perforated at intervals through its bottom, and with a supplemental trough $D^6$, secured beneath it, as shown, to receive the material falling through the perforations. The top $D^7$ of the casing is hinged thereto, as shown at $e$, so that the interior is easily accessible and formed open at the center $D^8$, as shown, and with the surrounding portion curved downward and inward, as at $D^9$. Surrounding the upper portion of the top $D^7$ is a trough $D^{10}$ to receive the overflow from the casing. All of the troughs $D^4\ D^6\ D^{10}$ are formed inclined downward or lowest at one point and with pipes $D^{11}\ D^{12}\ D^{13}$ leading from these lowest points, so that the contents of the troughs may be readily discharged. The pipe $D^{11}$ is provided with a stop-cock $D^{14}$ and ends above a receiver $D^{15}$, into which the mercury from the trough $D^4$ may be drawn when required. The pipe $D^{12}$ is also provided with a stop-cock $D^{16}$ and ends above a receiver $E'$. Within the receiver $E'$, just below the discharge end of the pipe $D^{12}$, is suspended a small vessel $E^2$, having a small mercury-pocket $E^3$ in its bottom, and into which all the material flowing through the pipe $D^{12}$ falls and from which it overflows into the larger receptacle $E'$. The pipe $D^{13}$ is arranged to conduct the material from the trough $D^{10}$. In the bottom of the trough $D^{10}$, opposite the entrance to the discharge-pipe $D^{13}$, a pocket $D^{17}$ is formed to contain a supply of mercury, as shown, this pocket having a stop-cock $D^{18}$ by which the mercury may be drawn off.

Secured upon the upper end of the pipe B, within the casing $D^2$, is a hood $D^{19}$, connected by a slatted cone $D^{20}$ to the pipe B, and preferably screwed to the pipe, so as to be easily removable. The lower edges $g$ of the hood $D^{19}$ project downward to a point near the conical bottom $D^3$ of the casing. A rubber or other suitable packing $e^2$ will be placed in the joint between the parts $D^2$ $D^7$ to make the joint water-tight.

The operation is as follows: The material containing the metals or mineral concentrates to be saved having been properly crushed, separated, or disintegrated, as before mentioned, is fed into the head of the sluice-box, and as it flows downward the heavier particles sink to the bottom, and as the flowing material is retarded by the obstructions $b$ these heavier particles fall through the meshes of the perforated metal covers $d$ into the sunken riffles $a'$, and are carried thence by the pipes $a^2$ and B into the concentrator. The concentrator is set so that a sufficient head will be provided to the flowing material to cause it to rise into and flow through the concentrator. The pipes $a^2$ will only be large enough to conduct away the material which enters the riffles $a'$ or may be regulated by stop-cocks $a^4$, if preferred. The flowing material, carrying with it the heavier particles which have fallen to the bottom of the sluice-box, rises against the under side of the hood $D^{19}$ and is thence thrown downward and flows beneath the edge $g$, the heavier particles being thereby precipitated into the mercury-amalgam in the troughs $D^4$, which immediately receives and holds the metallic particles contained in the material treated, but allows all the other matter to be carried along with the flowing water. In some placer mines a large percentage of platinum is present with the gold and other metals in combination with the black sand, and being carried upward and outward by the current is caught in the trough $D^5$, and falling through the perforations into the supplemental trough $D^6$ is discharged from thence through the pipe $D^{12}$ into the receiver $E'$. Some of the small metallic particles of gold or other metals susceptible to the influence of the amalgam may possibly escape contact with the mercury in the trough $D^4$, and if any such particles are carried away with the black sand or mineral concentrates they will be caught by the mercury-pocket $E^2$. The lighter material continuing to flow upward runs over the trough $D^{10}$ and is thence carried by the discharge $D^{13}$ to to the waste-flume. If any small metallic particles are carried over the top $D^7$, they will be caught by the mercury in the pocket $D^{17}$. By forming the top $D^7$ curving downward and inward the upward-flowing material is caught and thrown downward again, thereby greatly increasing the precipitation of the heavier particles and increasing the efficiency of the apparatus.

The concentrator may be constructed of iron or any other suitable material and operated as above described, or it may be made of copper and have both the inner and outer surfaces over which the material flows or is brought in contact in its passage through the concentrator covered with mercury-amalgam.

The above construction should be used in all cases where the material treated contains fine or flour gold, making it entirely impossible for any metallic particles to escape contact with the amalgamated surfaces.

While I prefer the arrangement of the concentrator shown in Figs. 7 and 8, with the pipe B entering through the bottom $D^3$, the pipe B may be arranged to enter from the top, as shown in Fig. 9. In this case a flange or band $D^{21}$ will be arranged to inclose the lower end of the inlet-pipe to secure the necessary rising of the water beneath the hood $D^{19}$ and prevent it from being thrown with too great force into the casing. This rim $D^{21}$ will have vent-holes $i$ for the escape of any mercury which may pass through the pipe B.

In Fig. 9 the casing and troughs are shown formed of sheet metal and with an additional mercury-trough $D^{22}$ in the bottom, which may be found advantageous under some circumstances.

Any number of the mercury-troughs may be arranged in the concentrator; but generally one, or sometimes two, will be found sufficient.

When the pipe B leads in at the bottom, as in Fig. 7, a vent-pipe $h'$ with a stop-cock $h^2$ will be an essential feature to conduct any mercury from the amalgam-plates which may be carried along by the water.

In Figs. 10, 11, and 12 are shown the details of an attachment to the concentrator, which will be employed to draw off the mercury when required, as well as to prevent the formation of "pockets" to retain the mercury. Leading downward from the lowest point of the amalgam-trough $D^4$ is a pipe $F^2$, and ending in a small drum or receiver $F'$. From the bottom of this drum $F'$ a pipe $F^3$ leads to the receiver $D^{15}$, the pipes $F^2$ $F^3$ and the drum $F'$ thus corresponding to the pipe $D^{11}$ in Figs. 7 and 9. Leading from the lowest point of the pipe B, which is generally at the point where it turns upward in entering the casing $D^2$, a pipe $h'$ leads into the drum $F'$ to serve as a drainage-tube for any amalgam which may be carried into the pipe B to prevent it from accumulating and "pocketing" in the lowest point of the piping. By this arrangement the drum $F'$ serves as a receiver for the amalgam from the pipe B, and also as a drum for the reception of the discharge $F^2$ from the amalgam-trough $D^4$, and from which it is conveyed by the pipe $F^3$ to the receptacle $D^{15}$. The drum $F'$ also serves as a gathering-chamber to provide for the free flowing of the amalgam to prevent pocketing at any part of the system. A stop-cock $F^4$ is placed in the pipe $F^2$, between the trough $D^4$ and the drum $F'$, and another stop-cock $F^6$ will be placed in the pipe $F^3$ to control the discharge, the stop-cock $F^4$ having a stem $F^5$, by which it may be actuated. Some of the water will flow through the drainage-pipe $h'$, and to provide for its discharge a vent-pipe $h^3$ is carried from the drum $F'$ upward through the trough $D^4$ and provided with a downwardly-turned upper end $h^4$, so that the water flowing through the pipe $h'$ will rise into the concentrator and be turned downward by the curved end $h^4$, and thereby prevented from being thrown upward with too great force. Thus all the amalgam carried off by the pipe B will settle in the drum $F'$ and be conveyed from thence by the pipe $F^3$ into the receiver $D^{15}$, while the water drained away by the pipe $h'$ will rise through the vent $h^3$ into the casing and be prevented from creating back-pressure in the piping or from interfering with the perfect action of the apparatus. By this arrangement the flowing material may be perfectly controlled, and any mercury-amalgam which may be carried along by the flowing material will be caught and saved as well as to prevent the formation of pockets for the mercury.

Having thus described my invention, what I claim as new, and desire to secure by Letters Patent, is—

1. A sluice box having sunken riffles at intervals and with obstructions at the lower edges of said sunken riffles, and pipes leading from said sunken riffles, and a concentrator into which the pipes from said riffles lead, consisting of a casing having a mercury amalgam trough around the interior of its lower part, a hood beneath which the material carried by said pipe rises, whereby the heavier particles are separated in said sluice box, and carried to the concentrator, and the inflowing material turned downward before passing through said concentrator to cause it to be precipitated upon the mercury troughs, substantially as set forth.

2. In a concentrator and sluice box, an inclined sluice box having sunken riffles at intervals across its bottom, an elevation across the bottom of the sluice box at the downstream edge of each riffle, a removable perforated covering over the inlet of each of said riffles and curved upward to meet the top of said elevation, whereby the flowing material is retarded and an opportunity given to the heavier particles to settle, substantially as and for the purpose set forth.

3. In a concentrator and sluice box, a casing having a conical bottom with a mercury trough encircling its base, the inlet for the material to be treated arranged to discharge upon the apex of the conical bottom, a deflecting hood above said conical bottom and beneath which the material enters the casing, a cover to said casing having a central opening and with the inner edges of said central opening curving downward, a receiving trough surrounding said cover and provided with an outlet, and an amalgam pocket in said cover trough opposite said outlet, substantially as and for the purpose set forth.

4. In a concentrator and sluice box, a casing having a conical bottom with a mercury trough encircling its base, the inlet for the material to be treated arranged to discharge upon the apex of the conical bottom, a deflecting hood above said conical bottom and beneath which the material enters the casing, a mercury receiving drum having a discharge pipe provided with a stop-cock, a discharge pipe leading from said amalgam trough to said receiving drum and provided with a stop cock, a drain pipe connecting the lowest point of the inlet to said casing with said drum, and a vent pipe rising from said drum into said casing, substantially as and for the purpose set forth.

5. In a concentrator, a casing having a conical bottom, an inlet pipe for the material to be treated entering said casing, a hood over the discharge end of said inlet pipe, an amalgam trough around the interior of its lower part, a perforated trough surrounding the interior of said casing above said amalgam trough, and means for discharging the contents of said perforated trough, substantially as set forth.

6. In a concentrator, a casing having a conical bottom, an inlet pipe for the material to be treated entering said casing, a hood over the discharge end of said inlet pipe, an amalgam trough surrounding the interior of its lower part, a perforated trough surrounding the interior of said casing above the amalgam trough, and means for discharging the contents of said perforated trough, in combination with a receiver for the contents of said perforated trough containing a receiver pan within said receiver and having an amalgam pocket, substantially as set forth.

In testimony whereof I have hereunto set my hand in the presence of two subscribing witnesses.

HERBERT L. PHILLIPS.

In presence of—
C. N. WOODWARD,
C. A. BURNETT.